United States Patent
Mead et al.

(10) Patent No.: US 11,891,788 B1
(45) Date of Patent: Feb. 6, 2024

(54) SEWER CLEANOUT CAP AND RELATED METHODS

(71) Applicant: Executive High Reach Maintenance, Inc., Mesa, AZ (US)

(72) Inventors: Richard Mead, Chandler, AZ (US); Jacob Keane, Chandler, AZ (US)

(73) Assignee: Executive High Reach Maintenance, Inc., Mesa, AZ (US)

( * ) Notice: Subject to any disclaimer, the term of this patent is extended or adjusted under 35 U.S.C. 154(b) by 285 days.

(21) Appl. No.: 17/182,567

(22) Filed: Feb. 23, 2021

(51) Int. Cl.
*A01M 25/00* (2006.01)
*E03F 9/00* (2006.01)
*A01M 1/20* (2006.01)

(52) U.S. Cl.
CPC ............. *E03F 9/00* (2013.01); *A01M 1/2005* (2013.01); *A01M 25/002* (2013.01); *A01M 25/004* (2013.01)

(58) Field of Classification Search
CPC .............. A01M 1/2005; A01M 25/002; A01M 25/004; A01M 25/00; E03F 9/00; E03F 3/04; E03F 3/00; F16L 55/115; F16L 55/1152; A01K 93/00; A01K 93/02
USPC ....................... 43/131, 132.1, 124; 119/51.04
See application file for complete search history.

(56) References Cited

U.S. PATENT DOCUMENTS

| | | | | |
|---|---|---|---|---|
| 2,800,231 A | * | 7/1957 | Hicks ....................... | E03C 1/264 |
| | | | | 4/301 |
| 2,856,724 A | * | 10/1958 | Bodenbach ........... | A01M 29/12 |
| | | | | 4/209 R |
| 2,984,208 A | * | 5/1961 | Kopietz ................. | A01K 61/80 |
| | | | | 43/44.99 |
| 3,106,797 A | * | 10/1963 | Hancock ................ | A01K 93/00 |
| | | | | 43/43.11 |
| 3,643,632 A | * | 2/1972 | Poirot .................... | A01K 61/80 |
| | | | | 119/51.04 |

(Continued)

FOREIGN PATENT DOCUMENTS

| | | | | |
|---|---|---|---|---|
| CN | 109221076 A | * | 1/2019 | ............ A01M 25/00 |
| DE | 19612883 A1 | * | 10/1997 | .......... A01M 25/004 |

(Continued)

OTHER PUBLICATIONS

Riise, "Researchers find cocktail of pesticides in salmon feed, but say levels pose no risk to human health," https://www.intrafish.com/feed/researchers-find-cocktail-of-pesticides-in-salmon-feed-but-say-levels-pose-no-risk-to-human-health/2-1-896099, Oct. 24, 2020. (Year: 2020).*

(Continued)

*Primary Examiner* — Kathleen I Alker
(74) *Attorney, Agent, or Firm* — IPTechLaw (57) ABSTRACT

Implementations of sewer cleanout caps may include a cap having a first side and the second side opposite the first side. The cap may be configured to be inserted into a sewer cleanout line with the second side facing an inside of the sewer cleanout line. Implementations of sewer cleanout caps may include a rod coupled to and extending from the second side of the cap. The rod may be configured to extend through and couple to a bait. Implementations of sewer cleanout caps may also include a bait retainer configured to couple to the rod and secure the rodenticide to the rod and a spacer coupled over the rod and configured to provide space between the rodenticide and the second side. A length of the rod extending from the second side may be adjustable.

20 Claims, 6 Drawing Sheets

(56) References Cited

U.S. PATENT DOCUMENTS

| | | | | |
|---|---|---|---|---|
| 3,906,656 | A * | 9/1975 | Burke | A01M 25/004 |
| | | | | 43/131 |
| 4,398,186 | A * | 8/1983 | Statz | E03F 7/00 |
| | | | | 340/625 |
| 4,460,462 | A * | 7/1984 | Arneson | E04H 4/1236 |
| | | | | 210/167.16 |
| 5,520,219 | A * | 5/1996 | Hessian | G01M 3/022 |
| | | | | 138/90 |
| 7,887,697 | B2 * | 2/2011 | Worth | E03F 5/041 |
| | | | | 239/57 |
| 8,496,811 | B2 * | 7/2013 | Cohen | E03C 1/264 |
| | | | | 210/232 |
| 10,801,874 | B2 * | 10/2020 | Nilsen | G01F 23/32 |
| 2003/0014905 | A1 * | 1/2003 | Baker | A01M 1/2011 |
| | | | | 43/124 |
| 2017/0360024 | A1 * | 12/2017 | Bittlinger | A01M 25/004 |
| 2018/0132475 | A1 * | 5/2018 | Bittlinger | A01M 1/2011 |

FOREIGN PATENT DOCUMENTS

| | | | | |
|---|---|---|---|---|
| FR | 2765455 A1 * | 1/1999 | | A01M 25/00 |
| KR | 101685359 B1 * | 12/2016 | | F16K 15/03 |
| WO | WO-2012090764 A1 * | 7/2012 | | A01N 59/16 |
| WO | WO-2016123338 A1 * | 8/2016 | | A01M 1/20 |

OTHER PUBLICATIONS

Machine translation of CN-109221076-A to Yao. (Year: 2019).*
Machine translation of KR-101685359-B1 to Heo. (Year: 2016).*
Machine translation of WO-2012090764-A1 to Arahara. (Year: 2012).*
Machine translation of DE-19612883-A1 to Krueger. (Year: 1997).*
Machine translation of FR-2765455-A1 to Schofel. (Year: 1999).*

* cited by examiner

FIG. 6

SEWER CLEANOUT CAP AND RELATED METHODS

BACKGROUND

1. Technical Field

Aspects of this document relate generally to plumbing devices, such as sewer cleanout caps for accessing a sewer cleanout line. More specific implementations involve sewer cleanout caps configured to hold bait for rodents.

2. Background

Conventionally, sewer cleanout caps are used to seal a sewer cleanout line. A sewer cleanout line connects the plumbing of a structure, such as a home or commercial building, to a public sewer system. Sewer cleanout caps may be removed to access and clean a main or lateral sewage line.

SUMMARY

Implementations of sewer cleanout caps may include a cap having a first side and the second side opposite the first side. The cap may be configured to be inserted into a sewer cleanout line with the second side facing an inside of the sewer cleanout line. Implementations of sewer cleanout caps may include a rod coupled to and extending from the second side of the cap. The rod may be configured to extend through and couple to a bait. Implementations of sewer cleanout caps may also include a bait retainer configured to couple to the rod and secure the rodenticide to the rod and a spacer coupled over the rod and configured to provide space between the rodenticide and the second side. A length of the rod extending from the second side may be adjustable.

Implementations of sewer cleanout caps may include one, all, or any of the following:

The bait may be one of a rodenticide and an insecticide.

The wire may be configured to directly couple to the rod and secure the bait.

The rod may include a plurality of telescoping tubes.

The rod may have a first end and a second end opposite the first end. The first end may be threadably connected to the second side of the cap.

The second end of the rod may be threaded and the bait retainer may be a threaded fastener.

The first side of the cap may be the color red.

Implementations of sewer cleanout caps may include a cap having a first side and a second side opposite the first side. The cap may be configured to be inserted into a sewer cleanout line with the second side facing an inside of the sewer cleanout line. Implementations of sewer cleanout caps may include a rod fixedly coupled to and extending from the second side of the cap. Implementations of sewer cleanout caps may also include a wire adjustably coupled to the rod. The wire may be configured to couple through a bait. Implementations of sewer cleanout caps may further include a wire retainer directly coupled to the rod and configured to secure the wire to the rod.

Implementations of sewer cleanout caps may include one, all, or any of the following:

The rod may be configured to couple through the bait.

A bait retainer may be configured to couple to the rod and secure the bait to the rod.

A spacer may be coupled over the rod and configured to provide space between the bait and the second side.

The length of the wire extending from the rod may be adjustable.

The rod may include a first end and a second end opposite the first end. The first end may be molded into the cap.

The second end may be threaded and the wire retainer may be a threaded fastener.

Implementations of sewer cleanout caps may include a cap having a first side and a second side opposite the first side. The cap may be configured to be inserted into a sewer cleanout line with the second side facing an inside of the sewer cleanout line. Implementations of sewer cleanout caps may include a first rod coupled to and extending from the second side of the cap. The first rod may be configured to extend through and couple to a bait. Implementations of sewer cleanout caps may also include a bait retainer configured to couple to the first rod and secure the bait to the first rod. Implementations of sewer cleanout caps may further include a spacer coupled over the first rod and configured to provide space between the bait and the second side. Implementations of sewer cleanout caps may likewise include a second rod fixedly coupled to and extending from the second side of the cap. Implementations of sewer cleanout caps may also include a wire configured to couple to the second rod. The wire may be configured to couple through the bait. Implementations of sewer cleanout caps may further include a wire retainer configured to directly couple the wire to the second rod.

Implementations of sewer cleanout caps may include one, all, or any of the following:

The length of the first rod extending from the second side of the cap may be adjustable.

The first rod may include a first end and a second end opposite the first end. The first end may be threadably coupled within an opening of the cap. The length of the first rod extending from the second side of the cap may be configured to be shortened by screwing the first rod through the opening of the cap.

The first rod may be configured to form an air-tight seal within the opening of the cap.

The length of the wire configured to couple to the second rod may be between 1-3 feet.

The length of the first rod extending from the second side of the cap may be fixed.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended sewer cleanout caps will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such sewer cleanout caps, and implementing components and methods, consistent with the intended operation and methods.

Figure 1:
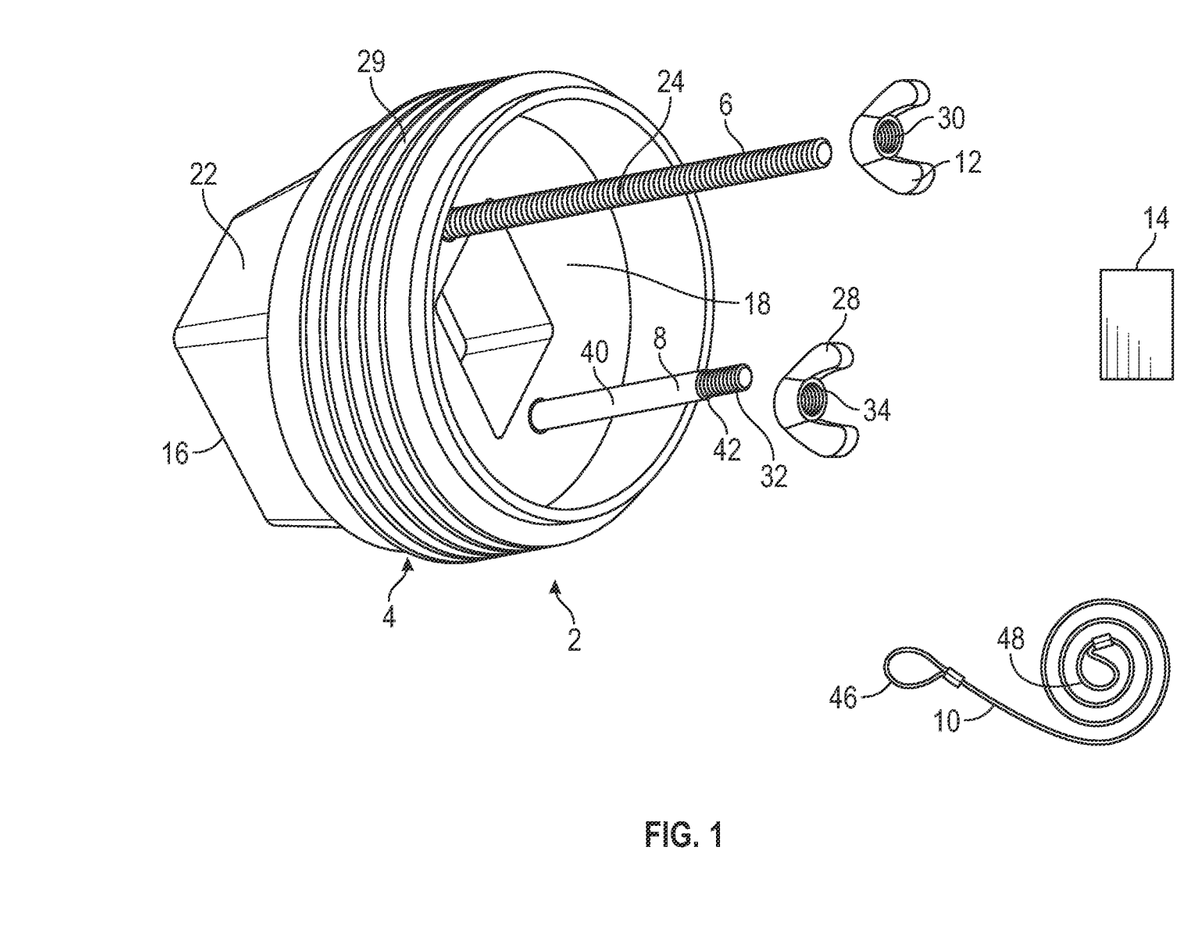
FIG. 1 is a break apart view of an implementation of a sewer cleanout cap.

Referring to FIG. 1, a break a part view of a sewer cleanout cap is illustrated. Referring to FIGS. 2-6, a second implementation of a sewer cleanout cap is illustrated. The implementation illustrated by FIG. 1 is nearly the same as the implementation illustrated by FIGS. 2-6, with the only difference being the type of wire used in conjunction with the sewer cleanout cap. Accordingly, common reference numerals are used to identify common elements of the implementations of FIG. 1 and FIGS. 2-6.

As illustrated by FIG. 1, a sewer cleanout cap 2 is configured to be inserted into a sewer cleanout line when installed. As shown in the FIGS., the sewer cleanout cap 2 may include one or more of the following: a cap 4, a first rod 6, a second rod 8, a wire 10, a bait retainer 12, a wire retainer 28, and a spacer 14. The sewer cleanout cap 2 may be configured to secure bait thereto.

As illustrated by FIGS. 1-6, cap 4 has a first side 16 and a second side 18 opposite the first side. The first side 16 describes the outer surface of the cap 4 or the side that faces away from the sewer cleanout line when installed. The cap 4 has a second side 18 which describes the inner surface of the cap 4 or the side that faces toward the sewer cleanout line when installed.

As illustrated by FIGS. 1, 3, 4 and 6, in various implementations the first side 16 of the cap 4 may include a raised head 22. The perimeter of the raised head may be, by non-limiting example, a circle, oval, triangle, square, quadrilateral, polygon, hexagon, or any other type of shape. In other implementations, the first side 16 of the cap 4 may not include a raised head. In such implementations, the first side 16 of the cap 4 may be flat, recessed, or employ some other configuration. Tools may be applied to the raised head 22 to ease removing or applying the cap 4 to the sewer cleanout line. For example, a tool having a lever with a notched end such as a wrench may be applied to the square head 22 to adjust the cap 4 as needed. In other implementations not having a raised head, other tools corresponding with the shape and design of the first side 16 of the cap 4 may be used to remove and/or insert the cap into and/or from a sewer cleanout line.

Implementations of the sewer cleanout cap 2 may include a cap 4 that is colored. In various implementations, the first side 16 of the cap 4 may be red or the entire surface of the cap 4 may be red. In such implementations, the red color may indicate to a person that the cap includes poison. In other implementations, the cap 4 may be, by non-limiting example white, black, yellow, blue, any other color, or any combination thereof. In various implementations, the cap may be marked with a poison indicator (such as a skull and cross-bones). In various implementations, the sewer cleanout cap complies with U.S. federal regulations, including regulations set by the Environmental Protection Agency (EPA) and/or the Federal Insecticide, Fungicide, and Rodenticide Act (FIFRA). In various implementations, the sewer cleanout cap may also comply with particular state regulations.

The cap 4 may be made of polyvinyl chloride (PVC), acrylonitrile butadiene styrene (ABS), brass, stainless steel, cast iron, polypropylene or some other material suitable for sewer or wastewater drainage applications. In some instances, the cap 4 may be made from the same material as the sewer cleanout line. For example, sewer cleanout lines made of PVC may have sewer cleanout caps made of PVC, and sewer cleanout caps made of cast iron may have sewer cleanout lines made of cast iron.

In various implementations, the diameter of the cap 4 matches the diameter of the sewer cleanout line that is configured to receive the cap. Additionally, in implementations where the cap 4 is threaded (such as is illustrated by FIGS. 1-6), the threads 29 of the cap 4 conform and match the threads of the opening to the sewer cleanout line thereby allowing the cap 4 to seal the opening of the sewer cleanout line. In other implementations, the cap 4 may expand to seal the opening of the cleanout line rather than thread into the opening. As to the dimensions of the cap 4, its diameter may range from 1½ inches to 12 inches. In particular implementations, the diameter of the sewer cleanout cap may be, by non-limiting example, 2, 2.5, 3, 3.5, 4, 4.5, 5, 5.5, or 6 inches. In other implementations, the diameter of the cap 4 may encompass other dimensions to seal the opening.

Figure 3:
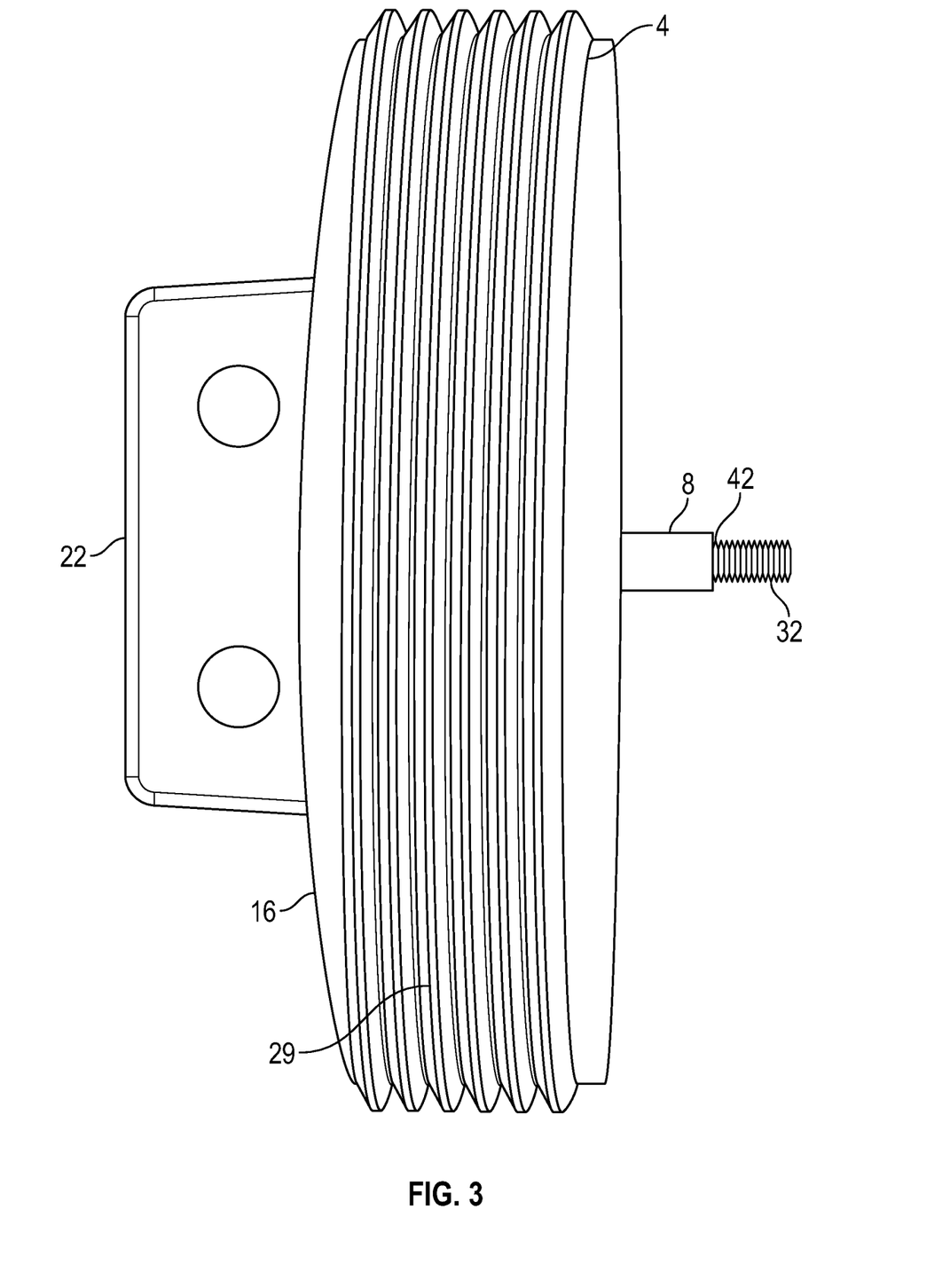
FIG. 3 is a side view of the cap of FIG. 2.

As shown in the FIGS. 1 & 4-6, first rod 6 and second rod 8 extend from second side 18 of the cap 4. In some implementations, first rod 6 may extend from second side 18 without accompanying second rod 8 while in other implementations second rod 8 may extend from second side 18 without accompanying first rod 6. For example, FIG. 3 illustrates an implementation where second rod 8 extends from second side 18 without first rod 6.

When both first rod 6 and second rod 8 extend from second side 18, the rods may be spaced sufficiently apart such that each rod may be attended to independent from the other. Functionally, first rod 6 and second rod 8 may extend sufficiently perpendicular to the second side 18 such that upon sealing the sewer cleanout line with the cap 4, the rods do not contact the inner wall of the line and impede proper sealing of the line.

The first rod 6 may be coupled to the second side 18 by any means known in the art. For example, the cap 4 may be drilled and tapped thus creating a tapped opening 50. The first rod 6 may then be threaded into the tapped opening 50. In various implementations, the tapped opening may be a blind opening. In other implementations, the tapped opening 50 may pass completely through cap 4. In this particular implementation, screwing the first rod 6 into the tapped opening 50 allows the length of the first rod 6 extending from second side 18 to be adjusted from nearly a full length of the first rod 6 to no length. In another implementation, the cap 4 may be molded around the first rod 6. In still another implementation, the first rod 6 may be welded or soldered onto the second side 18. In yet another implementation, the cap 4 and first rod 6 may be 3-D printed or cast and molded as a single unit. In various implementations, the length of the first rod 6 extending from the second side 18 may be fixed.

In implementations where the tapped opening extends entirely through the cap 4, the first rod 6 may form an airtight seal within the tapped opening when inserted into the tapped opening. In the implementations disclosed herein, the sewer cleanout cap may form an airtight seal with the sewer cleanout line.

Figure 4:
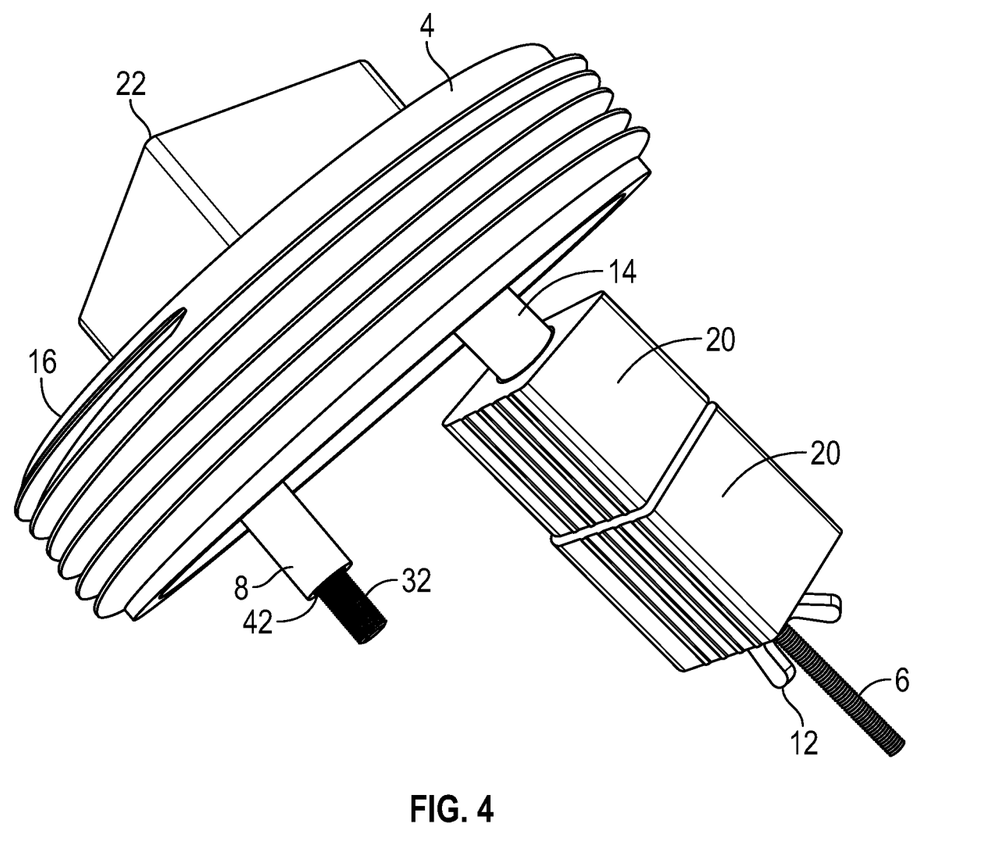
FIG. 4 is a perspective view of the sewer cleanout cap of FIG. 2 having bait affixed thereto.
Figure 5:
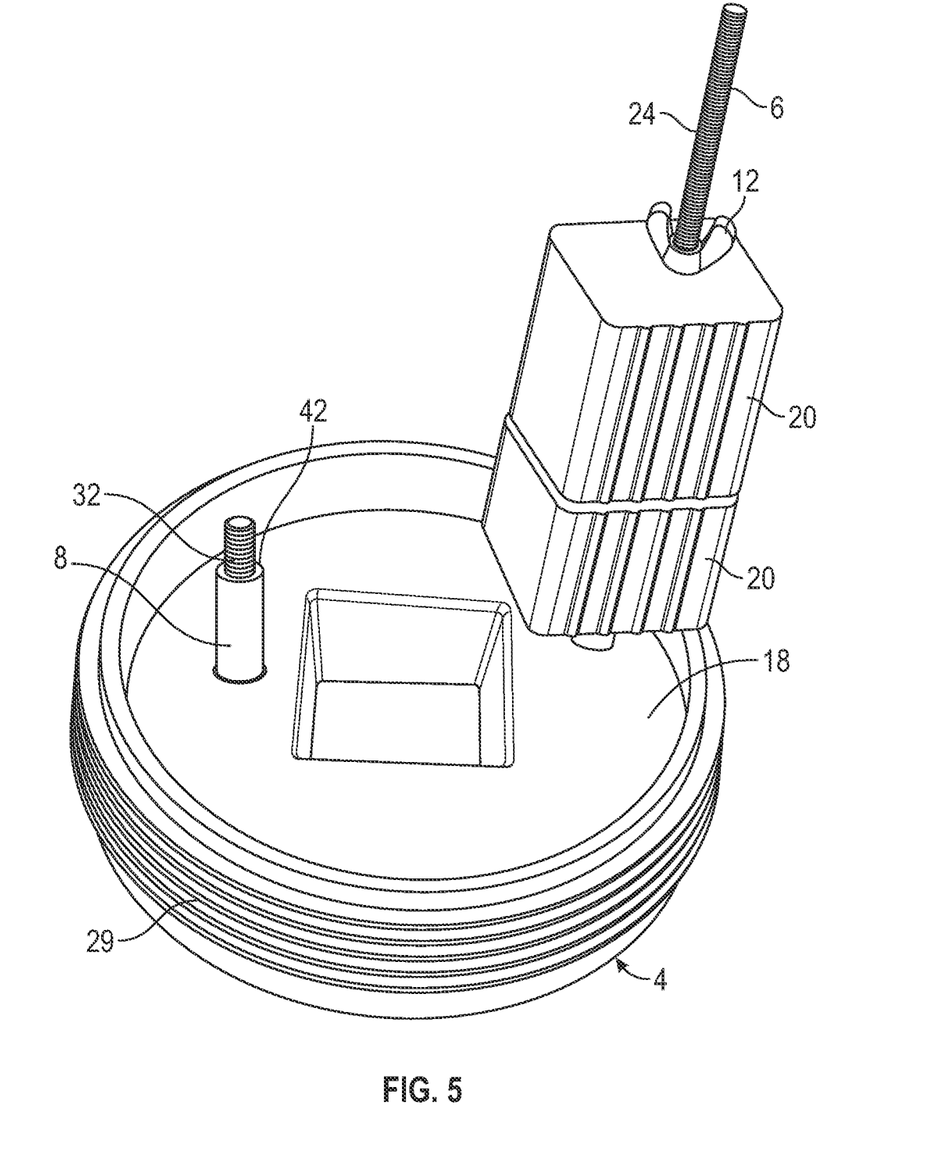
FIG. 5 is a bottom view of the sewer cleanout cap of FIG. 4.
Figure 6:
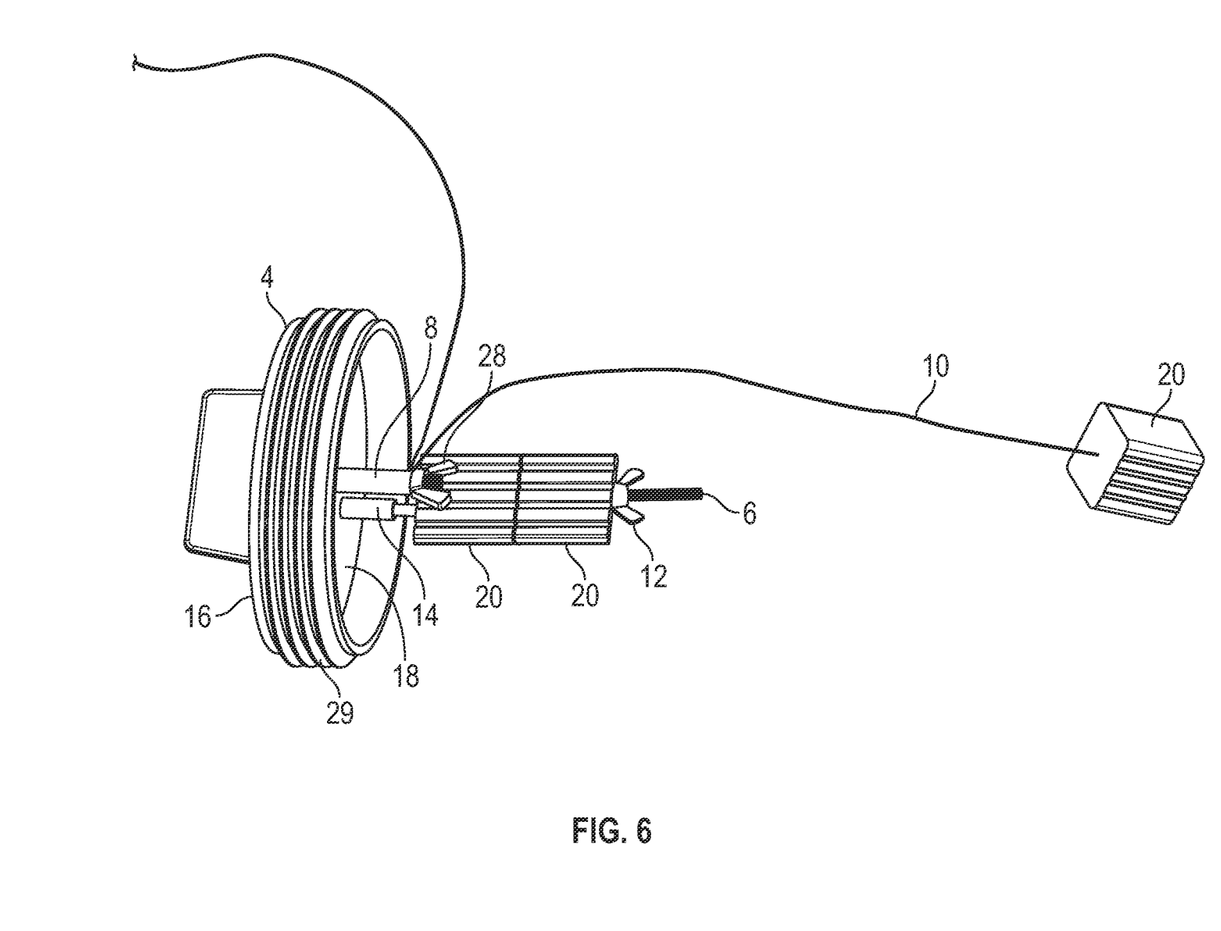
FIG. 6 is a side view of the sewer cleanout cap of FIG. 2 having bait affixed to the wire.

As illustrated by FIGS. 4-6, in various implementations the first rod 6 is configured to extend through and couple to the bait 20. The bait 20 may be any substance lethal to rodents or insects when ingested. For example, such substances may include rodenticide or insecticide. In implementations utilizing rodenticide, the rodenticide may include, for example, bromadiolone, paraffin, or other types of poison. In various implementations, the bait 20 may have a hole through the center allowing the bait 20 to slide onto the first rod 6. In other implementations, the bait 20 may be wrapped, stuck or configured in some other way to attach to the first rod 6.

The first rod 6 may be made of a metal, such as steel, stainless steel, aluminum, alloy steel, cast iron or brass. In other implementations, the first rod 6 may be made of a non-metal material, such as polyvinyl chloride (PVC) or acrylonitrile butadiene styrene (ABS). In still other implementations, the first rod 6 may be made of metal and then galvanized or zinc plated. Regardless as to the material of which first rod 6 is made from, first rod 6 is configured to bear the weight of the bait 20 and withstand a rodent interacting with the bait and/or first rod 6.

As illustrated by FIGS. 1-2 and 4-6, the length of the first rod 6 is fixed, but the length of the first rod 6 extending from the second side 18 of the cap is adjustable through the ability of the threaded rod to thread into and/or through the tapped opening 50 various amounts. In such implementations, the first rod 6 may be configured to accommodate various sewer cleanout line sizes and configurations. For example, if the length of the first rod is 6 inches, and there is a distance of four inches from the second side 18 of the cap to the far sidewall of the line perpendicular to and/or intersected by the portion of the of the line receiving the sewer cleanout cap, then the length of the first rod 6 may be shortened to a length of 2-3 inches in order to prevent the end of the first rod from hitting the far sidewall of the line perpendicular to the sewer cleanout cap and to also prevent the first rod 6 from substantially interfering with the passage of sewage through the line.

In particular implementations, the length of the first rod may be six inches. In other implementations, the length of the first rod may be more than or less than 6 inches, including lengths as short as 1 inch or as long as 3 feet. The length of the first rod may be configured to accommodate the space of the sewer line it enters into.

Although not illustrated by the FIGS., in some implementations, the length of the first rod 6 may be adjustable. In such implementations, the first rod may comprise a plurality of telescoping tubes that allow the length of the first rod 6 to be adjusted.

In various implementations, the sewer cleanout cap, may include multiple interchangeable rods having fixed and varying lengths. In such implementations, the installer of the cap may select the appropriate length of rod to attach to the second side of the cap based upon the design and dimensions of the sewer cleanout line the cap is inserted into. In such implementations, the sewer cleanout cap may include 2, 3, 4, 5, 6, or more than 6 interchangeable rods. Any of the interchangeable rods may include a fixed length of 1, 2, 3, 4, 5, 6, or any other number of inches. In various implementations, the multiple interchangeable rods may be part of a sewer cleanout cap kit including any of the other elements disclosed herein.

As illustrated by FIGS. 1-2 and 4-6, the first rod 6 is threaded with threads 24. Although illustrated with threads, in other implementations first rod 6 may not be threaded. If threaded, the threads 24 may extend the length of the first rod 6 as shown. In other implementations, the threads 24 may not extend the length of the first rod 6, but rather extend a predetermined distance from each end of the first rod 6. The threads 24 may be fine or course threads from The ISO Metric Screw Thread (in millimeters) or The Unified Screw Thread (in inches) series. In other implementations, the threads 24 may be from some other thread series.

As illustrated by FIGS. 4-6, bait retainer 12 is coupled to first rod 6. Bait retainer 12 functions to secure the bait 20 to the first rod 6. The threads 30 of bait retainer 12 may be of any thread series that matches the threads 24 of first rod 6. Bait retainer 12 may be made of metal such as steel, stainless steel, aluminum, alloy steel, or brass. In other implementations, the bait retainer 12 may be made of a non-metal such as polyvinyl chloride (PVC) or acrylonitrile butadiene styrene (ABS). In still other implementations, the bait retainer 12 may be made of metal and galvanized or zinc plated.

As illustrated by FIGS. 1-2 and 4-6, bait retainer 12 may be a wing nut. In other implementations, bait retainer 12 may be some other type of nut, such as a square nut, flange nut, hex nut, nylon insert lock nut or some other type of nut configured to secure bait 20 to the first rod 6. In yet other implementations, the bait retainer 12 may not have threads but may include another securing mechanism, such as, by non-limiting example, a pin, clip, clamp, key, retaining ring or other type of securing mechanism.

In various implementations, and as illustrated by FIGS. 4-6, the sewer cleanout cap may include a spacer 14 coupled over the first rod 6 and located between the second side 18 and bait 20. In such implementations, spacer 14 provides spacing between second side 18 and bait 20. By providing spacing, the spacer may prevent a rat from chewing at the second side 18 of the cap 4 while the rat is chewing at the bait. The spacer 14 may be cylindrical as shown in the FIGS., or may be some other shape. The spacer 14 may be made of a metal such as steel, stainless steel, aluminum, alloy steel, or brass. In other implementations, the spacer 14 may be made of a non-metal such as polyvinyl chloride (PVC) or acrylonitrile butadiene styrene (ABS). In still other implementations, the spacer 14 may consist of metal and be galvanized or zinc plated. In various implementations, the length of the spacer may be one inch. In other implementations, the length of the spacer may be less than or more than 1 inch. The spacer 14 may be any length, size, and shape that sufficiently prevents bait 20 from directly contacting second side 18, and in turn, prevents a rat from chewing on the second side 18 of the cap while chewing at the bait or after the rat has finished consuming the bait. Additionally, the spacer 14 may be a non-threaded or threaded through-hole spacer.

Referring to FIGS. 1-6, in various implementations the sewer cleanout cap may include a second rod 8. The second rod 8 may be coupled to the second side 18 of the cap 4 using any coupling mechanism disclosed herein, or any other coupling mechanism known in the art. For example, the cap 4 may be molded around the second rod 8 such that the second rod 8 extends from the second side 18. In another implementation, the cap 4 may be drilled and tapped such that the second rod 8 can be threaded into the second side 18 of cap 4. In still another implementation, the second rod 8 may be welded or soldered onto the second side 18. In yet another implementation, the cap 4 and second rod 8 may be 3-D printed or cast and molded as a single unit.

The second rod 8 may be made of a metal, such as steel, stainless steel, aluminum, alloy steel, cast iron, or brass. In other implementations, the second rod 8 may be made of a non-metal such as polyvinyl chloride (PVC) or acrylonitrile butadiene styrene (ABS). In still other implementations, the second rod 8 may be made of a metal and then galvanized or zinc plated.

Similar to first rod 6, the length of the second rod 8 and/or the length of the second rod 8 extending from the second side 18 of the cap 4 may be fixed or adjustable. In particular implementations the length of the second rod is ½ inch. In other implementations, the length of the second rod may be more than or less than ½ inch.

As shown in the FIGS., the second rod 8 may be threaded with threads 32 that extend a predetermined distance from each end of the second rod 8. The threads 32 of second rod 8 may be fine or course from The ISO Metric Screw Thread (in millimeters) series or The Unified Screw Thread (in inches) series. In other implementations, the threads 32 may be from some other thread series.

In various implementations, the sewer cleanout cap includes a wire retainer 28. As illustrated by FIG. 6, wire retainer 28 may secure the wire 10 to second rod 8. In some implementations, a shoulder 42 is formed between the threads 32 and non-threaded portion 40 of the second rod 8. The shoulder 42 acts in conjunction with the wire retainer 28 to secure the wire 10 between the shoulder and the wire retainer.

The threads 34 of wire retainer 28 may be of any thread series that matches the threads 32 of second rod 8. Wire retainer 28 may be made of a metal such as steel, stainless steel, aluminum, alloy steel, or brass. In other implementations, the wire retainer 28 may be made of a non-metal such as polyvinyl chloride (PVC) or acrylonitrile butadiene styrene (ABS). In still other implementations, the wire retainer 28 may be made of metal and then galvanized or zinc plated.

In various implementations, the wire retainer 28 may be a wing nut. In other implementations, wire retainer 28 may be some other type of nut, such as a square nut, flange nut, hex nut, nylon insert lock nut or some other type of nut having the means to secure the wire to the second rod 8. In yet other implementations, the wire retainer 28 may be a pin, clip, clamp, or key. In still other implementations, the wire retainer 28 may be in the form of a hole extending perpendicular through the second rod 8, thereby allowing the wire to slip through the hole and tie back onto itself.

Although not illustrated, in various implementations the sewer cleanout cap may employ some other configuration aside from the second rod 8, such as a screw post and screw combination. In such implementations, the screw post may be coupled to the second side 18 and the screw threads into the screw post and secures the wire. Similarly, in some implementations, first rod 6 may take the form of a screw post and screw combination. In this implementation, the screw post may be coupled to the second side 18 and the screw threads into the screw post and secures the bait 20 to the screw.

Referring back to FIG. 1, a first implementation of a wire 10 included with a sewer cleanout cap is illustrated. The wire is configured to couple bait to the second rod 8. In various implementations, the wire 10 includes loops 46 and 48 as depicted in FIG. 1. In such implementations, loop 48 of wire 10 may pass though bait 20 and then passes through loop 46 thereby securing bait 20 to wire 10. Loop 48 may then be secured to the second rod 8 using the wire retainer 28.

Figure 2:
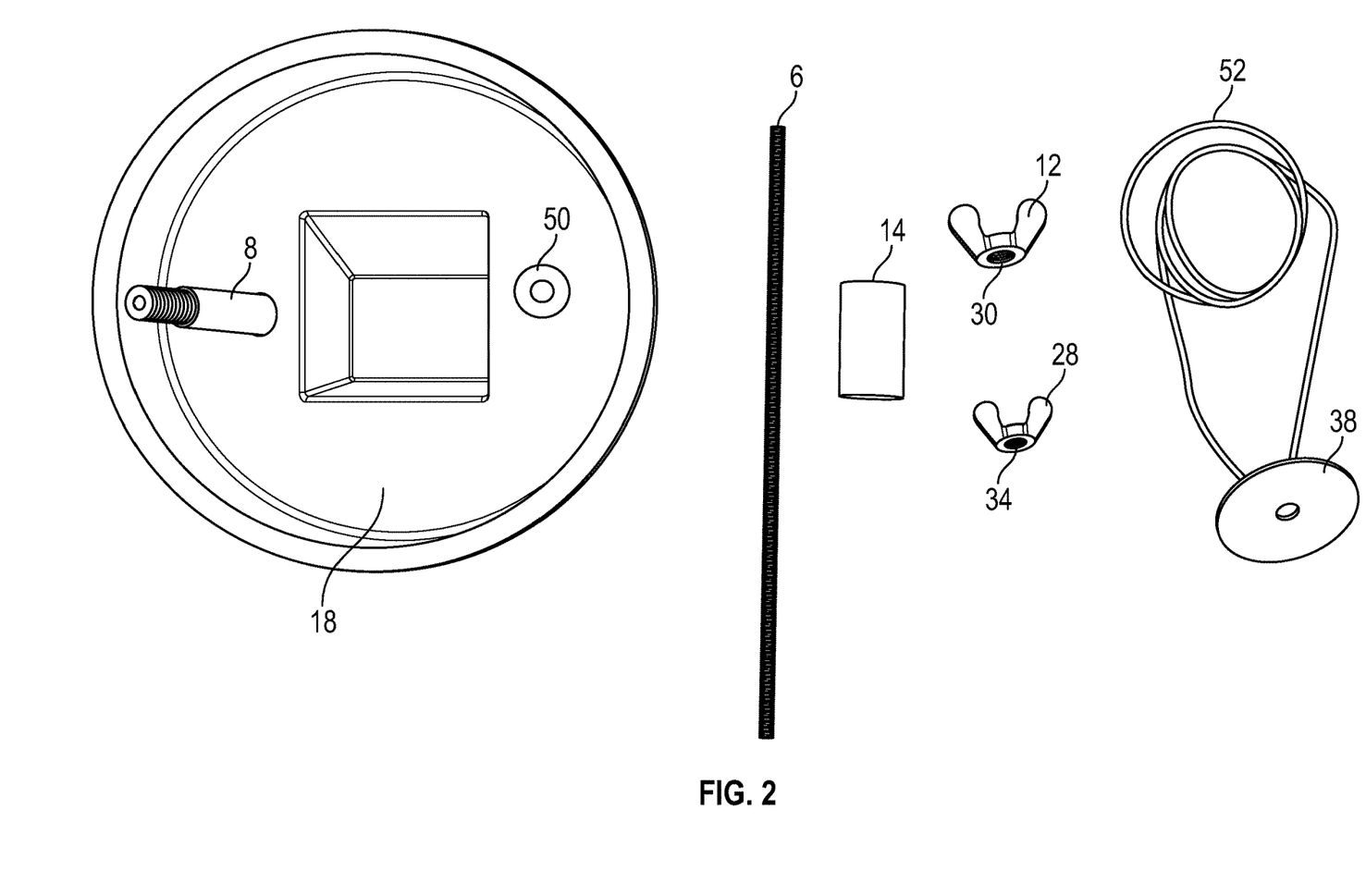
FIG. 2 is a break apart view of another implementation of a sewer cleanout cap.

Referring to FIG. 2, another implementation of a wire 52 of a sewer cleanout cap is illustrated. In various implementations, one end of the wire may include a loop configured to attach to the second rod 8 and the opposing end of the wire may be coupled to a washer 38. Wire 52 passes through bait 20 thereby securing bait 20 against washer 38.

The length of wire, as measured from bait 20 to where wire couples to the second rod 8, may be adjusted. In one implementation, the length of wire may be adjusted by securing wire to second rod 8 with wire retainer 28 at various points along the wire. In such implementations, the loop at the end of the wire need not be used to couple the wire to the second rod 8. Alternatively, in various implementations the loops at the end of each wire may be formed by a clasp. In such implementations, the clasp may allow the wire to pass therethrough, thereby adjusting the length of the wire between the second rod 8 and the bait and/or the size of the loop.

As illustrated, the wire is a flexible strand of material. The strand may be round, half-round, square or some other shape. The material may be of various metal and alloys such as iron, steel, brass, bronze, copper, aluminum or zinc, or non-metal such as a type of plastic. The diameter of the wire 10 may be from 1 gauge (0.283 in.) to 20 gauge (0.035 in.) or from 7/0 gauge (0.49 in.) to 1/0 gauge (0.306 in), or some other dimension. The length of wire may range from 1 ft. to 6 ft., but may encompass other lengths depending upon the length of the sewer cleanout line. In particular implementations, the length of the wire is 3 ft.

Although not illustrated by the FIGS., in another implementation of the sewer cleanout, the wire may be coupled to first rod 6. In this implementation, bait 20 may be either attached to first rod 6 or to the wire. Bait retainer 12 may also secure bait 20 or the wire to first rod 6.

In yet another implementation of the sewer cleanout 2, bait 20 may couple and extend through second rod 8. In this implementation, wire retainer 28 may then secure either the wire 10 or the bait 20 to second rod 8. Bait 20 may also be secured to wire 10.

The sewer cleanout cap 2 may be used in commercial or residential applications to exterminate rodents such as rats. To exterminate rodents in a sewer cleanout line, bait 20 may be secured to either first rod 6 or the wire. In implementations where the sewer cleanout cap is inserted into a vertical line, the bait may be attached to the wire and the wire may be adjusted so as to hang the bait so it is readily accessible to rats passing through the horizontal line intersected by the vertical line, but still remains out of passing sewage. In implementations where the sewer cleanout cap is inserted into a horizontal line perpendicular to the main horizontal line, the bait may be attached to the first rod and the first rod may be adjusted so as to extend horizontally from the second surface 18 of the cap and be readily accessible to rats passing through the main horizontal line. As described above, the wire may be secured to either first rod 6 or second rod 8. After attaching bait 20 to the cap 4, cap 4 may be coupled to a sewer cleanout line. As rodents pass through main sewer lines towards a commercial or residential building, they must pass through the sewer cleanout line and past the bait 20. The bait 20 coupled to the cap 4 attracts the rodents and proves lethal, thereby exterminating the rats prior to them entering the home or building.

While the implementations disclosed herein primarily refer to sewer cleanout caps used to exterminate rats, it is understood that the implementations disclosed herein may be fixed to other types of bait used to exterminate other types of pests, such as cockroaches.

In places where the description above refers to particular implementations of sewer cleanout caps and implementing components, sub-components, methods and sub-methods, it should be readily apparent that a number of modifications may be made without departing from the spirit thereof and that these implementations, implementing components, sub-components, methods and sub-methods may be applied to other sewer cleanout caps.

What is claimed is:

1. A sewer cleanout cap comprising:
   a cap comprising a first side and a second side opposite the first side, wherein an outer sidewall of the cap is threaded, wherein the cap is configured to be secured within a sewer cleanout line with the second side facing an inside of the sewer cleanout line;
   a rod coupled to and extending from the second side of the cap, wherein the rod is configured to extend through and couple to a bait;
   a bait retainer configured to couple to the rod and secure the bait to the rod; and
   a cylindrical and non-threaded spacer configured to couple over the rod and configured to be positioned entirely between the bait and the second side;
   wherein the cylindrical and non-threaded spacer is configured to contact the second side;
   wherein the rod is configured to extend horizontally into the sewer cleanout line; and
   wherein a length of the rod extending from the second side is adjustable.

2. The sewer cleanout cap of claim 1, wherein the rod is directly coupled to the bait, wherein the bait is a rodenticide.

3. The sewer cleanout cap of claim 1, further comprising a wire configured to directly couple to the rod, wherein the wire is configured to secure the bait within the sewer cleanout line.

4. The sewer cleanout cap of claim 1, wherein the cap is secured to a sewer cleanout line and the rod extends horizontally into the sewer cleanout line.

5. The sewer cleanout cap of claim 4, wherein the second end is threaded and the bait retainer is a threaded fastener.

6. The sewer cleanout cap of claim 1, wherein the first side of the cap is red.

7. A sewer cleanout cap comprising:
   a cap comprising a first side and a second side opposite the first side, wherein the cap comprises a plurality of threads configured to secure the cap within a sewer cleanout line, wherein the cap is configured to be inserted into the sewer cleanout line with the second side facing an inside of the sewer cleanout line;
   a rod fixedly coupled to and extending from the second side of the cap;
   a wire adjustably coupled to the rod, wherein the wire is configured to couple through a bait; and
   a wire retainer directly coupled to the rod and configured to secure the wire to the rod;
   wherein the wire is configured to hang within the sewer cleanout line parallel to the rod when the cap is secured within the sewer cleanout line; and
   wherein a length of the wire within the sewer cleanout line is greater than a length of any rod comprised in the sewer cleanout cap.

8. The sewer cleanout cap of claim 7, wherein the rod is coupled through the bait.

9. The sewer cleanout cap of claim 8, further comprising a bait retainer configured to couple to the rod and secure the bait to the rod.

10. The sewer cleanout cap of claim 9, further comprising a cylindrical spacer slidably coupled over the rod and configured to be positioned entirely between the bait and the second side, wherein the cylindrical spacer is at least one inch long.

11. The sewer cleanout cap of claim 7, wherein a length of the wire extending from the rod is adjustable.

12. The sewer cleanout cap of claim 7, wherein the rod comprises a first end and a second end opposite the first end, wherein the first end is molded into the cap.

13. The sewer cleanout cap of claim 12, wherein the second end is threaded and the wire retainer is a threaded fastener.

14. The sewer cleanout cap of claim 7, wherein the rod comprises a threaded portion and a non-threaded portion, wherein the non-threaded portion comprises a shoulder configured to, in conjunction with the wire retainer, secure the wire between the shoulder and the wire retainer.

15. A sewer cleanout cap comprising:
   a cap comprising a first side and a second side opposite the first side, wherein the cap comprises a plurality of threads configured to secure the cap within a sewer cleanout line, wherein the cap is configured to be inserted into the sewer cleanout line with the second side facing an inside of the sewer cleanout line;
   a first rod coupled to and extending from the second side of the cap, wherein the first rod is configured to extend through and couple to a bait;
   a bait retainer configured to couple to the first rod and secure the bait to the first rod;
   a non-threaded spacer configured to couple over the first rod and configured to be positioned entirely between the bait and the second side;
   a second rod fixedly coupled to and extending from the second side of the cap;
   a wire configured to couple to and hang from the second rod into the sewer cleanout line, wherein the wire is configured to couple through the bait; and
   a wire retainer configured to directly couple the wire to the second rod;
   wherein a width of the non-threaded spacer is consistent across an entire length of the non-threaded spacer;
   wherein a length of the wire within the sewer cleanout line is greater than a length of the first rod and a length of the second rod; and
   wherein the first rod is configured to extend horizontally into the sewer cleanout line.

16. The sewer cleanout cap of claim 15, wherein the cap is secured to a sewer cleanout line and the first rod extends horizontally into the sewer cleanout line.

17. The sewer cleanout cap of claim 15, wherein the first rod comprises a first end and a second end opposite the first end, wherein the first end is threadably coupled within an opening of the cap and wherein a length of the first rod extending from the second side of the cap is configured to be shortened by screwing the first rod through the opening of the cap.

18. The sewer cleanout cap of claim 17, wherein the first rod is configured to form an air-tight seal within the opening of the cap.

19. The sewer cleanout cap of claim 15, wherein the second rod is shorter than the first rod.

20. The sewer cleanout cap of claim 15, wherein the second rod comprises a threaded portion and a non-threaded portion, wherein the non-threaded portion comprises a shoulder configured to, in conjunction with the wire retainer, secure the wire between the shoulder and the wire retainer.

* * * * *